(12) United States Patent
Gu et al.

(10) Patent No.: US 11,443,291 B2
(45) Date of Patent: Sep. 13, 2022

(54) TRACKING PRODUCT ITEMS IN AN AUTOMATED-CHECKOUT STORE

(71) Applicant: AiFi Inc., Santa Clara, CA (US)

(72) Inventors: Steve Gu, San Jose, CA (US); Joao Falcao, San Jose, CA (US); Ying Zheng, San Jose, CA (US); Shuang Liu, Stanford, CA (US); Brian Bates, New Orleans, LA (US); Juan Ramon Terven-Salinas, Querétaro (MX); Carlos Ruiz, San Jose, CA (US); Tyler Crain, San Mateo, CA (US)

(73) Assignee: AIFI INC., Santa Clara, CA (US)

( * ) Notice: Subject to any disclaimer, the term of this patent is extended or adjusted under 35 U.S.C. 154(b) by 131 days.

(21) Appl. No.: 16/374,692

(22) Filed: Apr. 3, 2019

(65) Prior Publication Data

US 2020/0184442 A1    Jun. 11, 2020

Related U.S. Application Data (60) Provisional application No. 62/775,840, filed on Dec. 5, 2018, provisional application No. 62/775,837, filed
(Continued)

(51) Int. Cl.
 *G06Q 20/20* (2012.01)
 *G06N 20/00* (2019.01)

(52) U.S. Cl.
 CPC ......... *G06Q 20/203* (2013.01); *G06N 20/00* (2019.01); *G06Q 20/201* (2013.01)

(58) Field of Classification Search
 CPC .. G06Q 20/203; G06Q 20/201; G06Q 20/208; G06N 20/00; G06N 7/005; G07G 1/0054
 See application file for complete search history.

(56) References Cited

U.S. PATENT DOCUMENTS

| 8,010,402 B1 | 8/2011 | Sharma et al. |
| 9,704,155 B2 | 7/2017 | McCullagh et al. |

(Continued)

FOREIGN PATENT DOCUMENTS

| WO | 2018/014109 A1 | 1/2018 |
| WO | 2018/067429 A1 | 4/2018 |
| WO | 2018165173 A1 | 9/2018 |

OTHER PUBLICATIONS

PCT International Search Report and the Written Opinion dated Jan. 31, 2020, issued in related International Application No. PCT/US2019/062487 (8 pages).
(Continued)

*Primary Examiner* — Peter Ludwig
*Assistant Examiner* — Reva R Moore
(74) *Attorney, Agent, or Firm* — Sheppard Mullin Richter & Hampton LLP (57) ABSTRACT

Methods, systems, and apparatus, including computer programs encoded on computer storage media, for tracking a product item in an automated-checkout store. One of the methods includes receiving, from a plurality of sensors, data collected by the sensors, identifying an account associated with a person who enters the store, receiving data on movement of the product item collected by one or more of the sensors, determining an interaction between the person and the product item based on the data collected by one or more of the sensors, storing information associating the product item with the person; and deducting a payment amount from the identified account, wherein the payment amount is based on a price of the product item associated with the person.

20 Claims, 7 Drawing Sheets

Related U.S. Application Data on Dec. 5, 2018, provisional application No. 62/775,857, filed on Dec. 5, 2018, provisional application No. 62/775,844, filed on Dec. 5, 2018, provisional application No. 62/775,846, filed on Dec. 5, 2018.

(56) References Cited

U.S. PATENT DOCUMENTS

| | | | |
|---|---|---|---|
| 9,911,290 B1* | 3/2018 | Zalewski | G06Q 30/0633 |
| 10,019,654 B1 | 7/2018 | Pisoni | |
| 10,237,058 B2* | 3/2019 | Aihara | H04L 9/0816 |
| 10,242,501 B1 | 3/2019 | Pusch et al. | |
| 10,282,720 B1 | 5/2019 | Buibas et al. | |
| 10,310,597 B2 | 6/2019 | Biedert et al. | |
| 10,373,322 B1 | 8/2019 | Buibas et al. | |
| 2007/0183633 A1 | 8/2007 | Hoffman | |
| 2008/0243702 A1 | 10/2008 | Hart et al. | |
| 2012/0169879 A1 | 7/2012 | Libal et al. | |
| 2014/0358639 A1 | 12/2014 | Takemoto et al. | |
| 2015/0023562 A1 | 1/2015 | Moshfeghi | |
| 2016/0285793 A1 | 9/2016 | Anderson et al. | |
| 2017/0220855 A1 | 8/2017 | Bose et al. | |
| 2017/0256148 A1 | 9/2017 | King et al. | |
| 2018/0039745 A1 | 2/2018 | Chevalier et al. | |
| 2018/0096566 A1* | 4/2018 | Blair, II | G06Q 20/208 |
| 2018/0343432 A1 | 11/2018 | Duan et al. | |
| 2018/0373928 A1 | 12/2018 | Glaser et al. | |
| 2019/0121224 A1 | 4/2019 | Edwards et al. | |
| 2020/0019914 A1 | 1/2020 | Brosnan et al. | |
| 2020/0034807 A1 | 1/2020 | Shamai et al. | |
| 2020/0102286 A1 | 4/2020 | You et al. | |

OTHER PUBLICATIONS

PCT International Search Report and the Written Opinion dated Feb. 6, 2020, issued in related International Application No. PCT/US2019/062490 (14 pages).

* cited by examiner

TRACKING PRODUCT ITEMS IN AN AUTOMATED-CHECKOUT STORE

CROSS REFERENCE TO RELATED APPLICATION

This application claims the benefit of U.S. Provisional Patent Application No. 62/775,837, filed on Dec. 5, 2018, U.S. Provisional Patent Application No. 62/775,840, filed on Dec. 5, 2018, U.S. Provisional Patent Application No. 62/775,846, filed on Dec. 5, 2018, U.S. Provisional Patent Application No. 62/775,844, filed on Dec. 5, 2018, and U.S. Provisional Patent Application No. 62/775,857, filed on Dec. 5, 2018. The entirety of the aforementioned applications is incorporated herein by reference.

TECHNICAL FIELD

The disclosure relates generally to tracking product items in an automated-checkout store.

BACKGROUND

Retail environments may range in size from 100-square-feet mom-and-pop stores to 200,000-square-feet warehouse style grocery stores. A retail environment may provide for sale a variety of products and serve a variety of customers. Inventory management and customer service provided in the retail environment may often be labor-intensive. For example, employees are often charged with responsibilities such as checking inventory, replenishing products that are sold out, finding and organizing misplaced products, and checking out customers. Particular tasks for managing a retail environment may also be time-consuming for customers. For example, lines may often be formed in front of checkout counters, in which customers may wait for a cashier to scan individual product items and take payment information from other customers. Using employees to perform these tasks may also cause human errors, such as charging for wrong product items. The computer systems for managing different divisions (e.g., checkout, inventory, security) of the retail environment may often be separated and independent from each other. Such computer systems may be inefficient in communicating and coordinating with each other, particularly when solving problems that may require information from different divisions.

SUMMARY

Various embodiments of the present disclosure can include systems, methods, and non-transitory computer readable media for tracking a product item in an automated-checkout store.

According to one aspect, a method for tracking a product item in an automated-checkout store may comprise receiving, by a computer system and from a plurality of sensors including at least one or more cameras and one or more weight sensors, data collected by the sensors, identifying, by the computer system, an account associated with a person who enters the store, receiving, by the computer system, data on movement of the product item collected by one or more of the sensors, determining, by the computer system, an interaction between the person and the product item based on data collected by one or more of the sensors, storing, by the computer system, information associating the product item with the person, and deducting, by the computer system, a payment amount from the identified account, wherein the payment amount is based on a price of the product item associated with the person.

In some embodiments, one or more of the sensors may be affixed to one or more structures in the automated-checkout store, the one or more structures comprising: a ceiling, a floor, a shelf, a rack, or a refrigerator.

In some embodiments, the plurality of sensors may further comprise: a force sensor, a pressure sensor, a vibration sensor, a proximity sensor, a resistance-based film sensor, or a capacitive sensor.

In some embodiments, the method may further comprise extracting, by the computer system, from data received from one or more of the sensors, one or more features associated with the product item, the features comprising a weight, a shape, a color, a surface force image, a position, or a conductivity and determining, by the computer system using a machine-learning model, an identity of the product item based on one or more of the extracted features.

In some embodiments, the method may further comprise determining, by the computer system based on data received from a first sensor, a first identity for the product item associated with a first confidence score, determining, by the computer system based on data received from a second sensor, a second identity for the product item associated with a second confidence score, and selecting one of the first identity and the second identity as the identity of the product item based on a comparison of the first confidence score and the second confidence score.

In some embodiments, the method may further comprise obtaining, by the computer system based on data received from the sensors, a plurality of values associated with a characteristic of the product item, wherein each of the values is determined based on data received from one of the sensors and determining, by the computer system, a final value corresponding to the characteristic based at least in part on a weighted average of the plurality of values.

In some embodiments, the method may further comprise determining, by the computer system based on data received from one or more of the sensors, a movement path within the automated-checkout store associated with the person.

In some embodiments, the determining an interaction between the person and the product item may comprise determining, based on data received from one or more of the sensors, that the person is located in proximity to the product item in a period of time, detecting one or more movements of a hand of the person with respect to the product item, and determining the interaction based on the one or more detected movements.

According to another aspect, a system for tracking a product item in an automated-checkout store may comprise a computer system and a plurality of sensors including at least one or more cameras and one or more weight sensors, the computer system comprising a processor and a non-transitory computer-readable storage medium storing instructions executable by the processor to cause the system to perform operations comprising receiving, by the computer system and from the plurality of sensors, data collected by the sensors, identifying, by the computer system, an account associated with a person who enters the store, receiving, by the computer system, data on movement of the product item collected by one or more of the sensors, determining, by the computer system, an interaction between the person and the product item based on data collected by one or more of the sensors, storing, by the computer system, information associating the product item with the person, and deducting, by the computer system, a payment amount from the identified account, wherein the payment amount is based on a price of the product item associated with the person.

According to yet another aspect, a non-transitory computer-readable storage medium for tracking a product item in an automated-checkout store may be configured with instructions executable by one or more processors to cause the one or more processors to perform operations comprising receiving, from a plurality of sensors including at least one or more cameras and one or more weight sensors, data collected by the sensors, identifying an account associated with a person who enters the store, receiving, by the computer system, data on movement of the product item collected by one or more of the sensors, determining an interaction between the person and the product item based on data collected by one or more of the sensors, storing information associating the product item with the person, and deducting a payment amount from the identified account, wherein the payment amount is based on a price of the product item associated with the person.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. Particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

In some embodiments, a store may provide automated checkout services to customers. Such an automated-checkout store may comprise a plurality of sensors that collect data from the environment, and particular about product items and persons in the store. A computer system in the automated-checkout store may process the data collected by the sensors to recognize and track product items, to identify and track persons, and to determine interactions between the persons and the product items. Based on the sensor data, the computer system may determine a person's activities such as picking up a product item from a shelf, placing a product item back, dropping a product item in a shopping cart, or other activities of interest. The computer system may also determine the identities and prices of the product items interacted with by the person. In this manner, the computer system may automatically charge the person based on her purchase and generate an itemized receipt.

In some embodiments, a person entering such an automated-checkout store may provide identification information by, for example, swiping a payment card or identification card, scanning a quick response ("QR") code or a ticket. The person may then freely pick up product items on sale in the store. Based on data collected by sensors in the store, a computer system may automatically determine the activities of the person. After shopping, the person may directly walk out of the store, knowing that an appropriate payment will be automatically deducted from her account. Particular embodiments may reduce or eliminate the need for human labor for managing a retail environment, provide customers a quick and smooth shopping and checkout experience, and reduce a likelihood of mistakes that may be made by the retailer. Furthermore, particular embodiments use an integrated system to manage various aspects of the retail environment. Such a system may effectively coordinate various services and efficiently use or re-use information collected for different purposes. For example, a detected activity by a person of picking up a product item and placing it in a shopping cart may be used to determine an inventory level of the product item as well as to generate a bill for the customer. In this manner, the efficiency of computer systems used in retail environments may be improved.

In some embodiments, the automated-checkout system may be installed in a traditional retail environment by affixing sensors and computing systems in different areas of the environment. In other embodiments, the automated-checkout system may be implemented as a "Nano Store" or a walk-in vending machine, which may be a modular brick & mortar store that is built in with automated checkout technologies. The Nano Store or walk-in vending machine may be of a small and manageable size (e.g., 200 square feet). It may be built in with all the fixtures, sensors, and computer systems, so that the store will automatically monitor customer activities and provide automated checkout. It may be easily disassembled, re-assembled, and transported. Alternatively, it may be implemented within a unitary enclosure. The enclosure may be made mobile using, for example, wheels at the bottom. Robotic tools (e.g., robotic arms) may also be used in such a store to facilitate functions such as automatic stocking of product items.

In some embodiments, one or more vending machines may be attached to an external surface of an automated-checkout store. The vending machines provide for sale product items such as hot or cold drinks, food, tobacco products, other suitable product items, or any combination thereof. A customer may purchase product items from the vending machine using, for example, a credit card or a phone application. In some embodiments, one or more lockers may be attached to an external surface of an automated-checkout store. The lockers may be unlockable using passcodes. Packages for customers as well as product items bought from e-commerce websites may be placed in the lockers for the customers to pick up. As an example and not by way of limitation, after placing an order for a product item on an e-commerce website, a customer may receive an email indicating a locker that the product item is placed in and a passcode to open the locker. The customer may go to the automated-checkout store to pick up the product item. In some embodiments, the lockers may share a heating-cooling system associated with the automated-checkout store such that some of the lockers may be heated and some other lockers may be cooled. The different types of lockers may be color-coded to indicate their temperature (e.g., red for heated, blue for cooled, green for room-temperature ones). These temperature-controlled lockers may be suitable for products that require certain temperatures, such as hot dishes from a local restaurant or ice creams. In some embodiments, the automated-checkout store may be integrated with one or more other suitable devices (e.g., lottery machine).

Figure 1:
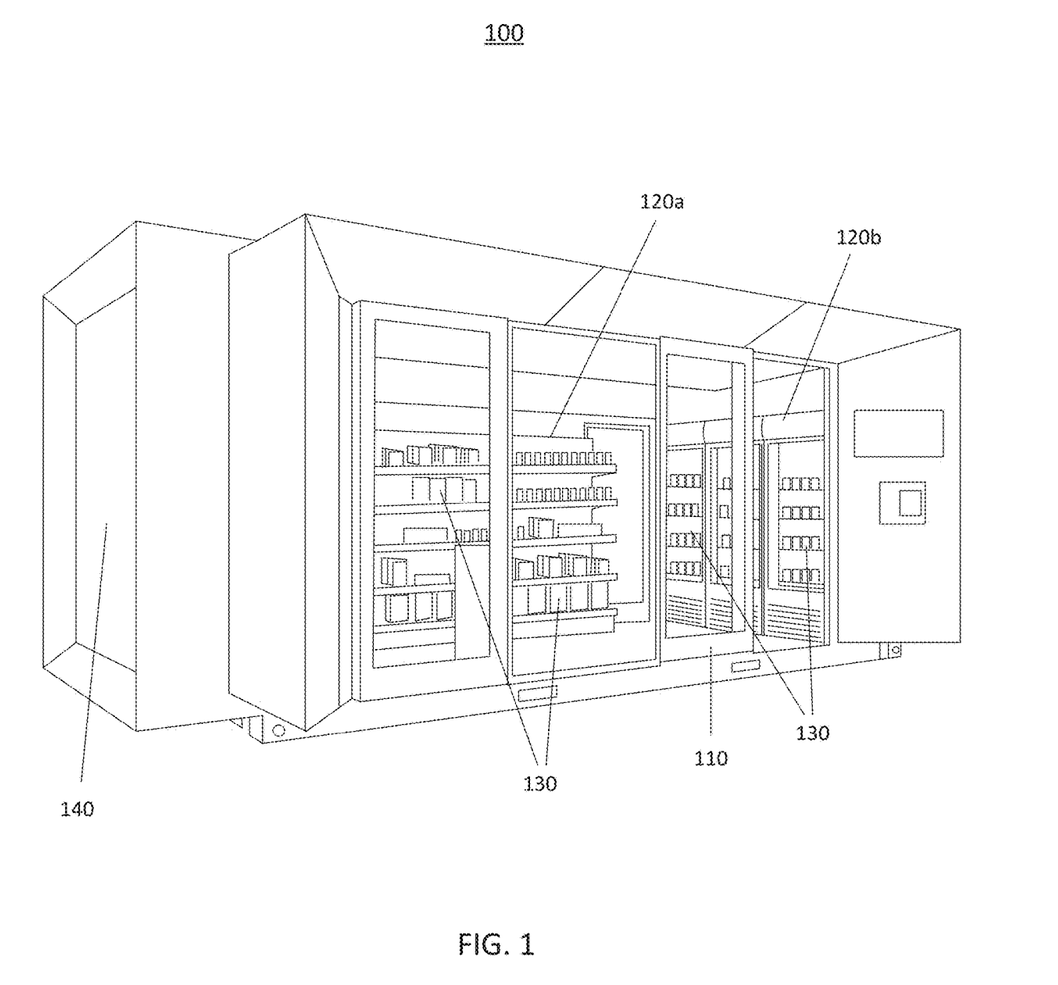
FIG. 1 illustrates an example setup of an automated-checkout store.

FIG. 1 illustrates an example setup of an automated-checkout store 100. The automated-checkout store 100 may comprise a system for tracking a product item in the store 100. In some embodiments, the automated-checkout store 100 may provide an enclosed environment. The store 100 may comprise one or more doors 110, and one or more shelves, such as 120a and 120b. The doors 110 may be hinged doors, revolving doors, sliding doors, or other suitable doors. In some embodiments, the store 100 may comprise two sets of doors 110 with a small space in between to prevent multiple people entering the store at once, which may complicate tracking of the people. In some embodiments, the shelves 120 may hold product items 130 for selection and purchase by a customer. In some embodiments, the automated-checkout store 100 may comprise one or more outer surfaces 140 that may be used for a plurality of potential purposes (e.g., di splaying advertisements).

Figure 2:
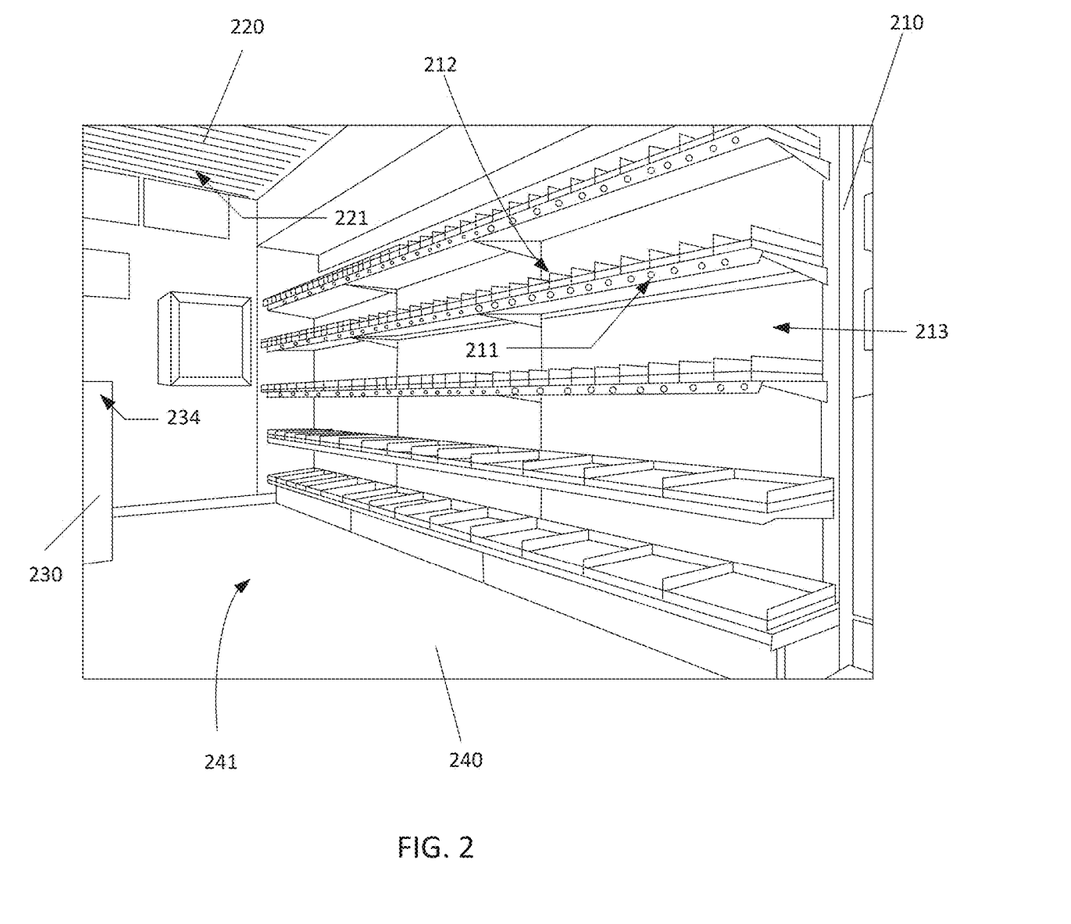
FIG. 2 illustrates example locations to place sensors in an automated-checkout store.

FIG. 2 illustrates example locations to place sensors in an automated-checkout store. In some embodiments, one or more sensors may be affixed to one or more structures in the automated-checkout store. The structures may comprise, for example, a ceiling, a floor, a shelf, a rack, a refrigerator, other suitable structures, or any combination thereof. Illustrated by FIG. 2 may be an inner space of an automated-checkout store. It may comprise one or more shelves 210, a ceiling 220, one or more fixtures 230 (e.g., a peg), a floor 240. In order to collect data about product items and persons in the automated checkout store, a plurality of sensors may be placed in various locations in the indoor environment. For example, one or more sensors 211 may be affixed to the bottom of each shelf, one or more sensors 212 may be affixed above each shelf, and one or more sensors 213 may be affixed on a backboard supporting the shelves. As another example, one or more sensors 221 may be affixed to the ceiling 220, one or more sensors 231 may be affixed to fixtures 230, and one or more sensors 241 may be affixed to the floor 240.

In some embodiments, the sensors placed in the automated-checkout store 100 may comprise one or more image sensors (e.g., RGB cameras, IR cameras, depth cameras), one or more weight sensors, one or more force sensors, one or more pressure sensors, one or more vibration sensors, one or more proximity sensors, one or more resistance-based film sensors, one or more capacitive sensors, other suitable sensors, or any combination thereof. The sensors may be used to collect signals associated one or more product items and one or more persons. In some embodiments, the sensors may be powered through one or more network cables using power over ethernet ("POE"). The sensors may also be powered using one or more other suitable methods or devices.

As an example and not by way of limitation, one or more weight sensors affixed to a shelf may measure weights of one or more product items; one or more pressure sensors affixed to the shelf may measure the shape of bottom surfaces of the product items and determine their respective positions. One or more image sensors may determine the colors and other appearance characteristics of the product items. Based on data from the weight sensors, pressure sensors, image sensors, or one or more other sensors, a computer system associated with the automated-checkout store may determine a type of the product items and a number of the product items that are placed on the shelf. Based on a change to the data from one or more of the sensors, the computer system may determine if one or more product items are placed on or removed from the shelf or if one or more product items are partially removed or depleted.

As another example and not by way of limitation, vibration sensors placed on corners of a shelf may be used to detect vibration corresponding to an event associated with product items placed on the shelf (e.g., a customer picking up a product item). One or more proximity sensors (e.g., comprising one or more infrared transceivers) placed on a surface of the shelf may detect a proximity of a hand of a customer to one or more product items, which may be used to determine a movement of the hand (e.g., hovering over a product item). The data gathered by the vibration sensors and the proximity sensors may be complemented by data from one or more image sensors which may comprise one or more images of the customer and the one or more product items. Based on the data collected by these sensors, a computer system associated with the automated-checkout store may determine one or more movements of the hand of a customer with respect to one or more product items and may thereby determine customer activities such as picking up a product item or placing a product item on a shelf.

As yet another example and not by way of limitation, a plurality of image sensors may be used to gather image data of a person moving in the automated-checkout store 100. One or more computing devices or components thereof (e.g., a graphics processing unit (GPU), a central processing unit (CPU), a system on a chip (SoC)) may be used to process digital images and videos captured by the image sensors. Each image sensor or group of image sensors may collect data from a particular area of the automated-checkout store 100. Data from each of one or more image sensors may be processed to determine a probability that a particular person is at a particular location. The processing results may be aggregated to determine a location of the person and to construct a model reflecting a movement path of the person during a particular period of time. The data gathered by the image sensors may be supplemented by data gathered by one or more weight sensors placed below the surface of the floor near the door 110 of the automated-checkout store 100. Changes to data from the weight sensors may indicate that a person walks in or out of the store 100.

In some embodiments, one or more image sensors in the automated-checkout store may be automatically calibrated. One or more projectors may be installed in the store. The projectors may project patterns on, for example, the floor or ceiling of the store. One or more parameters of the image sensors (e.g., position, angle, distortion factor) may be calibrated based on the portion of the pattern captured by the image sensors. Similarly, one or more patterns may be printed on one or more fixtures within the store (e.g., shelves). The image sensors may capture images of such patterns and automatically calibrate their parameters. In some embodiments, the projectors may also be used to project one or more images that may improve user experience. For example, price or other information about one or more products may be projected on the products.

Figure 3:
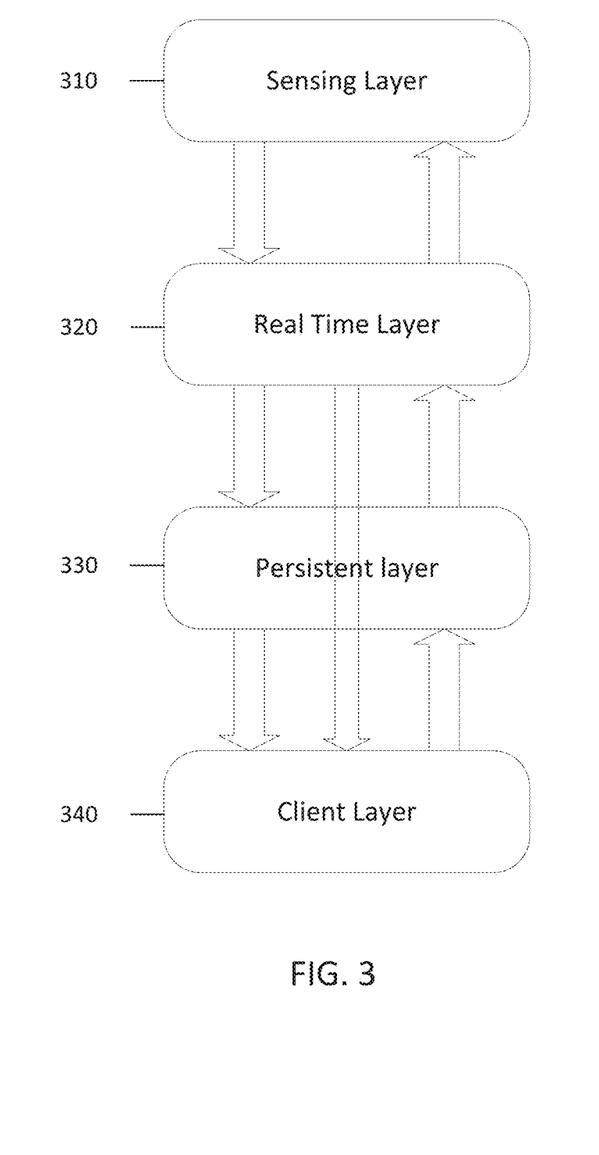
FIG. 3 illustrates an example architecture for gathering and processing data from sensors.

FIG. 3 illustrates an example system for gathering and processing data from sensors. In some embodiments, a computer system in an automated-checkout store may have the structure illustrated by FIG. 3 and may comprise one or more of the components or layers shown in FIG. 3. In some embodiments, the system may be configured to receive many types of input from many different sensing sources. These inputs may include image and/or video signals from an array of cameras mounted in various parts of an automated-checkout store such as the ceiling, cashier level, shelf level, signals from touch capacitive sensors on shelfs, signals from weight sensors on shelfs, signals from force sensors on shelfs, and/or vibration sensors on shelfs. The system may use these signals to identify a customer and monitor the product items that the customer takes out of the store, and thus automatically checkout the product items. The system may also use these signals to calculate an inventory level of each of a plurality of retail products within the store.

In some embodiments, the system may comprise a sensing layer 310 that include a plurality of sensors that provide the system with different types of data. One or more sensors (e.g., single camera (SC), multi-camera (MC), cameras at the checkout area of the retail store) may monitor people, such as customers and employees, as they move around and through the store. One or more sensors (e.g., capacitive sensors, force sensors, vibration sensors, weight sensors, location aware pressure sensors) may track objects such as retail products on a plurality of shelves.

In some embodiments, the system may comprise a real time layer 320 that may determine when trigger events occur and determine logic of virtual carts. For example, the real time layer 320 may be configured to analyze the 3D rending of motion of a particular customer and determine that the customer is reaching for an item on a particular shelf. Using this information along with weighting information from the particular shelf, as well as weight data, location aware pressure sensing data, and images of the particular shelf, the system can determine that a particular customer takes a particular product. The system is capable of taking information from a variety of sources, analyze the data in context with other data to obtain an accurate analysis of events occurring in the automated-checkout store. For example, the real time layer 320 at a present time may determine and log an event where the particular customer puts a bunch of bananas in a shopping cart. Subsequent to the present time, the real time layer may determine that out of a direct line of sight with one of the array of cameras in the retail store that the particular customer puts an item back on the shelf. Using weight information, location aware pressure sensing and vibration sensing, the system may output a plurality of probabilities of what the item that was placed on the shelf was. With the information that the bunch of bananas was previously placed in the shopping cart, the system may determine that where the particular customer put the bunch of bananas.

In some embodiments, the system may comprise a persistent layer 330 that may execute operations related to payments and customer authentication. For example, before a customer may be granted access to the automated-checkout store, the user may be required to swipe a credit card or provide login information. The persistent layer 330 may be configured to authenticate the user and/or payment method by the user.

In some embodiments, the system may comprise a client layer 340 that may execute operations related to client interaction. For example, the client layer 340 may provide an output or display at a checkout counter. The information displayed may comprise an itemized receipt of all of the items in a particular customer's possession. In some embodiments, the client layer 340 may be configured to provide personalized advertisement as the particular customer walks through the store. For example, if the system determines that the customer is a parent carrying a baby, as the customer walks down an aisle of baby products, the client layer 340 of the system may be configured to output advertisements of a sale for a particular brand of diapers.

In some embodiments, the automated-checkout store may be associated with a computer system for processing the data collected by various sensors. The computer system may comprise one or more suitable electronic devices. In some embodiments, the computer system may use sensor fusion to aggregate data received from multiple sensors. In doing so, the computer system may combine sensory data or data derived from disparate sources using error-resistance algorithms such that the resulting information has less uncertainty than would be possible when these sources were used individually. Using sensor fusion, the computer system may derive additional data than that sensed by each sensor (e.g., calculation of depth information by combining two-dimensional images from two cameras at slightly different viewpoints). In some embodiments, the computer system may perform direct fusion, which may comprise the fusion of sensor data from a set of heterogeneous or homogeneous sensors, soft sensors, and history values of sensor data. The computer system may also perform indirect fusion that uses information sources like a priori knowledge about the environment and human input. The computer system may use one or more methods or algorithms such as the central limit theorem, Kalman filter, Bayesian networks, Dempster-Shafer theory, or convolutional neural network. In some embodiments, sensor fusion for an automated-checkout store may be performed at a centralized computer system. Alternatively or additionally, sensor fusion may be performed by one or more localized computer sub-systems, whose outputs may later be aggregated. In some embodiments, using sensor fusion, the computer system may calculate a distribution for a particular value to be determined, including an average, a range, and one or more deviations. The computer system may also assign trustworthiness values for different factors contributing and weigh the factors based on the trustworthiness values.

A Bayesian network, decision network, probability network, or probabilistic directed acyclic graphical model may be a probabilistic graphical model (a type of statistical model) that represents a set of variables and their conditional dependencies via a directed acyclic graph (DAG). Nodes in a DAG may represent variables such as observable quantities, latent variables, unknown parameters, or hypotheses. Edges in a DAG may represent conditional dependencies;

nodes that are not connected (no path connects one node to another) represent variables that are conditionally independent of each other. Each node may be associated with a probability function that takes, as input, a particular set of values for the node's parent variables and gives (as output) the probability (or probability distribution, if applicable) of the variable represented by the node. Bayesian networks may be used to take an event that occurred and predict the likelihood that any one of several possible known causes was the contributing factor. Bayesian networks may be used to infer unobserved variables or to learn parameters or structures.

Figure 4:
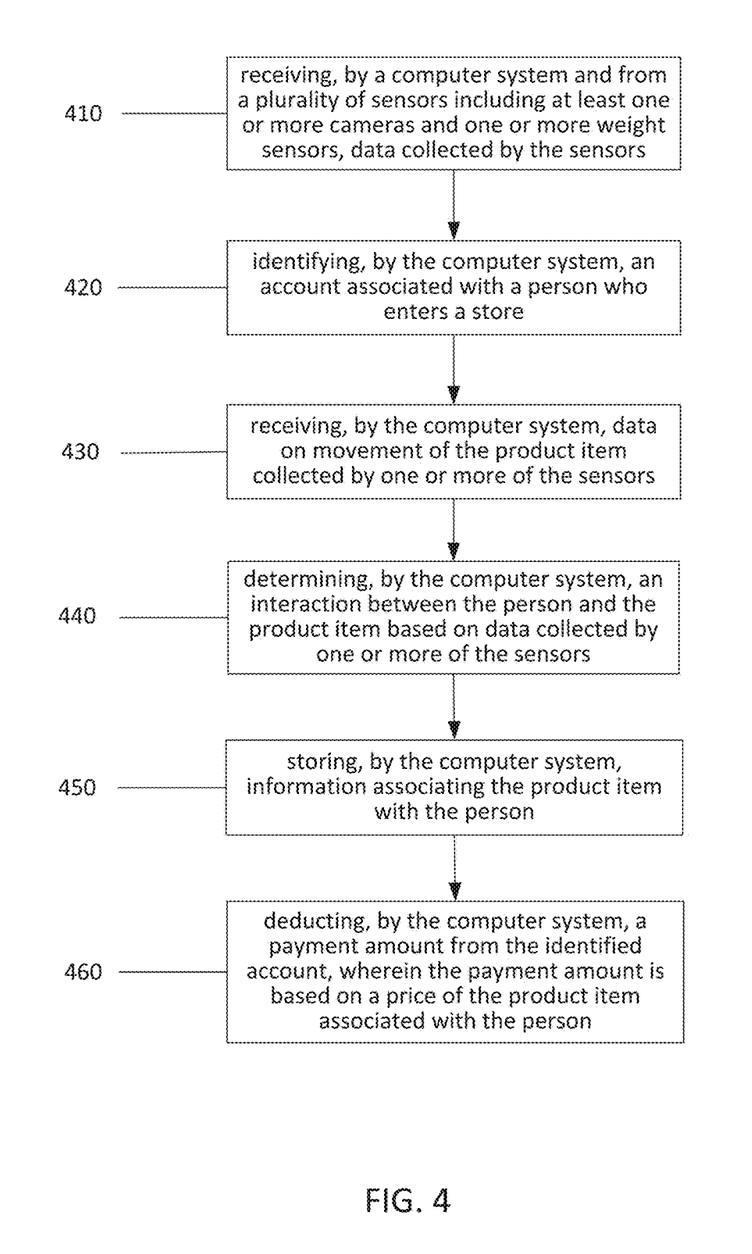
FIG. 4 illustrates an example method for tracking a product item in an automated-checkout store.

FIG. 4 illustrates an example method for tracking a product item in an automated-checkout store. The method may begin at step 410, where a computer system associated with the automated-checkout store may receive data collected by a plurality of sensors. The sensors may comprise at least one or more cameras and one or more weight sensors.

At step 420, the computer system may identify an account associated with a person who enters the store. In some embodiments, the computer system may determine that a person enters the store based on signals from one or more of the sensors such as, for example, a camera pointing at the door of the store or a weight sensor below the floor near the door. In some embodiments, the computer system may identify an account associated with the person based on information provided by the person. For example, the person may be required to swipe a credit card or provide login information before being granted access to the store. The computer system may identify the account associated with the person based on information associated with the credit card or the login. In some embodiments, the computer system may determine an account based on a determined identity of the user. The computer system may determine the identity of the person based on data received from one or more of the sensors (e.g., cameras). The received data may be fed into a machine-learning model for determining identity of users. The model may comprise features corresponding to characteristics such as hair color, appearance of cloths, height, other suitable features specified by human or generated by machine-learning algorithms, or any combination thereof. The machine-learning model may have been trained by real-world data or data generated by simulations. For example, the training data may be generated by modifying real-world images by changing a background or environment in which a person is located to be a plurality of options. The collected data may be compared with data stored by or otherwise accessible to the computer system that correlate accounts or identities of persons with characteristics of their appearance. In this manner, the account associated with the person may be identified without input from the person.

At step 430, the computer system receiving data on movement of the product item collected by one or more of the sensors. The movement of the product item may indicate that an event has occurred to the product item. The event may comprise, for example, a product item being picked up by a person, a product item being placed in a shopping cart, a product item being placed back on a shelf, another suitable event, or any combination thereof.

At step 440, the computer system may determine an interaction between the person and the product item based on data collected by one or more of the sensors. In some embodiments, to determine an interaction between the person and the product item, the computer system may determine, based on data received from one or more of the sensors, that the person is located in proximity to the product item in a period of time. It may then detect one or more movements of a hand of the person with respect to the product item and determine the interaction based on the one or more detected movements. In some embodiments, the computer system may perform gaze-tracking or eye-tracking on a person, based on which the computer system may determine one or more product items that the person is looking at. For example, one or more IR cameras may be placed on a shelf and be configured to catch light reflected from eyes (e.g., retinas) of the person. Based on data associated with the captured light, the computer system may determine a direction of the gaze of the person, thus determining one or more product items that the person is looking at.

Figure 5:
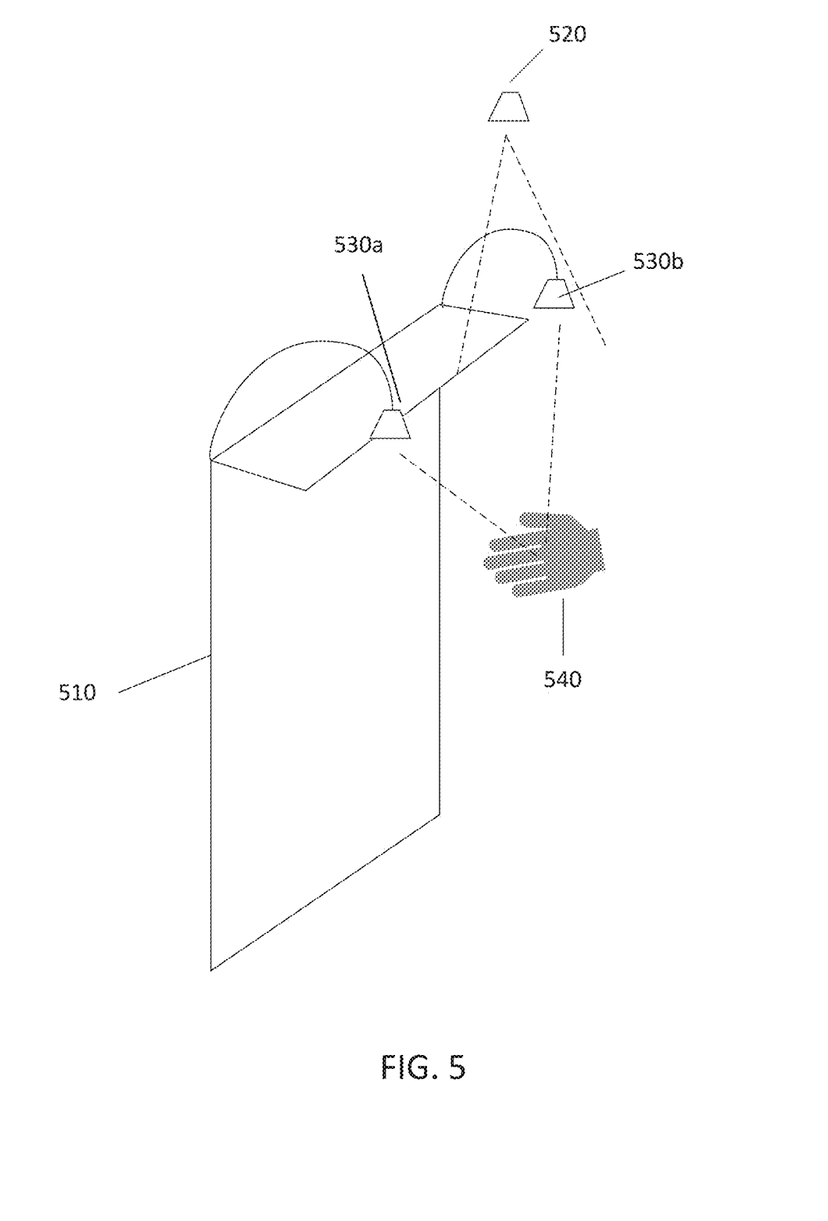
FIG. 5 illustrates an example setup for detecting interactions between a person and a product item using image sensors.

In some embodiments, an interaction between a person and a product item may be determined based on data collected by one or more image sensors. FIG. 5 illustrates an example setup for detecting interactions between a person and a product item using image sensors. As shown in FIG. 5, a person may interact with a product item placed on a fixture 510. Two image sensors 530a and 530b may be affixed on the fixture 510. An image sensor 520 may be affixed on the ceiling. The image sensors 520, 530a, and 530b may all be configured such that they can record images or videos of a person's hand 540 interacting with items held by the fixture 510.

Figure 6:
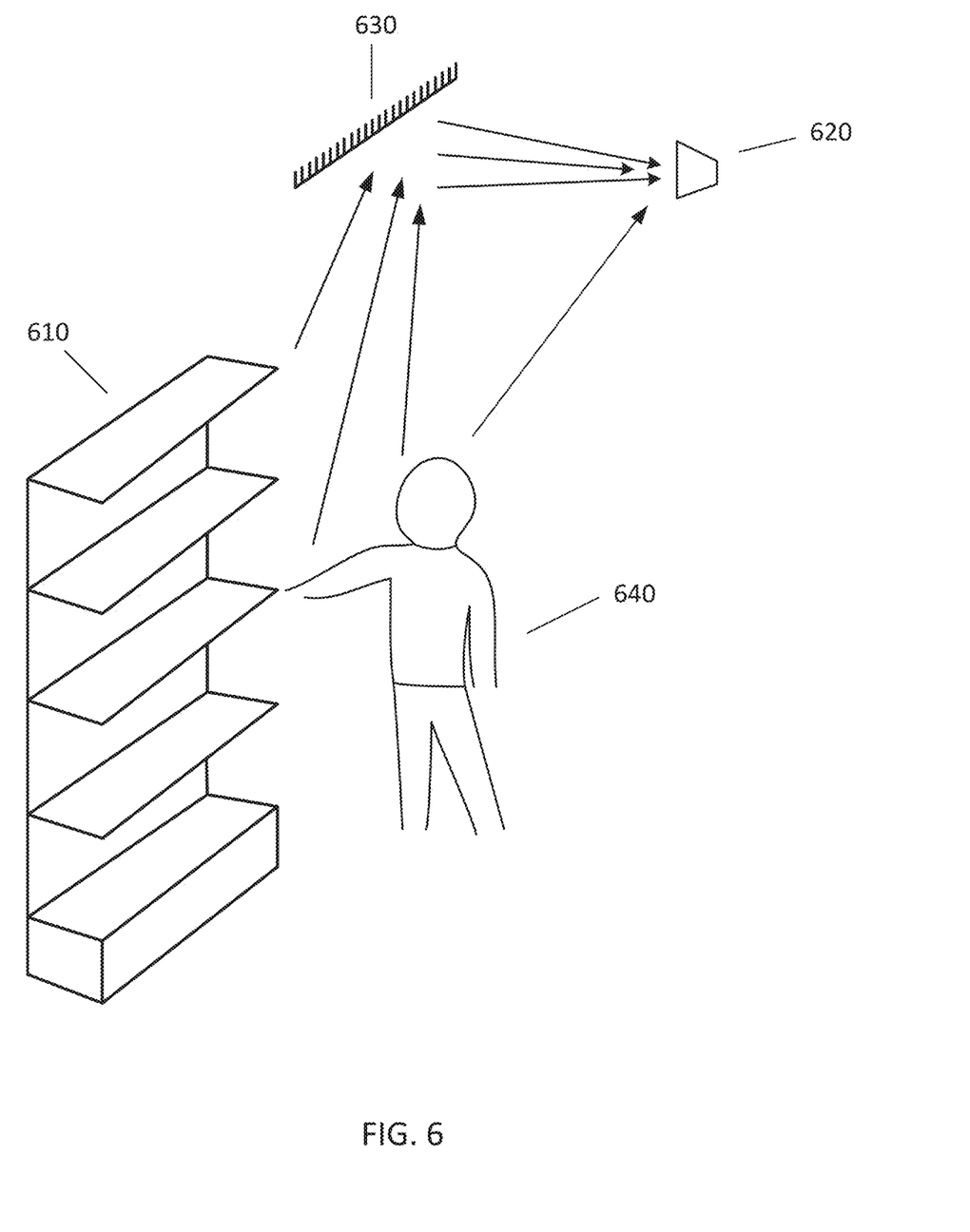
FIG. 6 illustrates an example setup for detecting interactions between a person and a product item using image sensors and optical devices.

FIG. 6 illustrates an example setup for detecting interactions between a person and a product item using image sensors and optical devices. As shown in FIG. 6, a person 640 may interact with a product item placed on a fixture 610. The setup may comprise a mirror 630 set at an appropriate angle with respect to the ground (e.g., 45 degrees). The mirror may be affixed on the fixture 610 or another object within the environment (e.g., ceiling). An image sensor 620 may be configured to capture light reflected by the mirror 630, which may include the product item and the hand of the person 640. In some embodiments, one or more other optical devices may be used to replace the mirror 630. Particular embodiments may reduce the number of image sensors needed to cover a particular field. Particular embodiments may allow placement of image sensors at convenient positions and may avoid obstruction by objects in an indoor environment. For example, with the help of optical devices, an image sensor affixed to the ceiling of the store may be able to collect visual data from certain angles that would normally require a substantially higher ceiling if the optical devices were not available.

In some embodiments, the computer system may be configured to utilize machine-learning models to keep track of inventory of product items and people interacting with the product items. The computer system may receive data from a plurality of sensors and apply the data to machine-learning models. The different sources may include digital images or videos from an array of cameras mounted in various parts of a retail store, such as the ceiling, cashier level, shelf level cameras, signals from weight sensors, force sensors and vibration sensors on shelves. The different types of data may be used to train the machine-learning model, and allow the machine-learning model to learn and recognize actions performed by customers in the retail environment and label these actions for future recognition. In addition to currently-received sensor data, the computer system may also consider previously-received data in determining the interaction. In particular, the computer system may calculate a conditional probability of a particular activity of a person based on prior detected activities of the person.

In some embodiments, digital images and video may be used with the support of other types of sensors to recognize the interaction between persons and product items placed in various areas of the store. The computer system may be configured to recognize consumer shopping behavior by estimating a three-dimensional (3D) location of a person's hand using digital images captured by the array of cameras. The recognition may be used by the machine-learning algorithm to recognize and provide a probability of various shopping behavior of the person in the retail environment. The shopping behavior may include the motion of a person's body, arms, or hands in an action of removing a product item from a shelf or returning the product item to the shelf.

In some embodiments, a plurality of image sensors may be used to predict the location of body joints. Red-green-blue (RGB) cameras, as well as infrared (IR) image sensors may be used to capture two-dimensional (2D) images. The 2D images may be analyzed to obtain 3D locations. Alternatively or additionally, a depth camera may be used to determine the depth of a body joint into an area containing a product item. It may be used jointly with the other cameras to estimate the 3D location of a person's body joints. The 3D hand location of the consumer may be estimated using digital images or video.

In some embodiments, the computer system may use the image data in conjunction with data received from weight sensors and location aware pressure sensors to predict a quantity and type of product items interacted with by the person. The machine-learning algorithm may be trained to connect and recognize certain motions of the person with changes in the placement of the product items. For example, the array of cameras may capture the person reaching for a product item on the shelf. The machine-learning model may be trained to recognize, through the analysis of 3D motions of the person, the motion of the body joints of a consumer which leads to the consumer reaching for the product item placed on the shelf. Using the analysis of the 3D motion alone, the machine-learning algorithm may not be able to obtain a probability of the retail product removed with high confidence if the consumer removed an item from the back of the shelf, or out of the range of the array of cameras. The computer system may obtain data from the weight sensors or location aware pressure sensors to determine a change in the weight or pressure of a particular bin of the shelf to aid in identifying the retail product removed from the smart shelf system with higher confidence.

In some embodiments, the computer system may use data collected by one or more weight sensors or one or more capacitive sensors to determine movement of a product item caused by interaction of a user. As an example and not by way of limitation, one or more load cells using resistive strain gauges may be fixed to one or more beams associated with a shelf. A force applied to the beam may cause a change to the resistance of the strain gauge, thus generating a voltage output. The voltage output may be proportional to the force. The voltage output may be communicated to the computer system through an interface circuit. In this manner, weight of product items placed on different areas of the shelf may be detected. As another example and not by way of limitation, an array of capacitance-sensing elements (e.g., using capacitive sensors) may be placed on a shelf. Because product items have different dielectric constants from air, placing a product item on the shelf may generate a change to the capacitance sensed by one or more of the capacitance-sensing elements. The change to the capacitance may depend on the material of the product item. A footprint of a product item (e.g., an image corresponding to the shape of a bottom surface of the product item, magnitude of signal corresponding to the material of the product item) may be generated based on data collected by the capacitance-sensing elements. Furthermore, a person touching a product item may also cause a change to the capacitance signal. In some embodiments, a shelf may be configured to sense weight and capacitance by integrating weight-sensing load cells with a capacitance-sensing surface. Alternatively, a capacitance-sensing surface may be made weight-sensitive by incorporating a material that changes in capacitance based on force felt. In some embodiments, the computer system may detect movement of a product item, a location of the product item that is moved, or a person's touching the product item based on signals received from the weight sensors and capacitive sensors.

In some embodiments, the computer system may further use data collected by one or more vibration sensors to determine an interaction between a person and a product item. The computer system may comprise a frequency-feature based extraction algorithm to detect an onset of a vibration signal. The system may use visual signals from cameras to assist to identify a product. For example, when a particular product item is picked up, the event may generate a particular vibration frequency, which may be recorded by one or more vibration sensors. Based on identification of the product item by one or more image sensors or one or more other sensors, the system may associate the particular frequency signature with the particular product items. The system may subsequently use the frequency signature to identify the event that this particular product is picked up.

The frequency feature based extraction algorithm may also be utilized to track and monitor people's behaviors. The system may be configured to sense and analyze vibration caused by human interactions in the store. For example, vibration of the ground, the sound created by footsteps, the opening and closing of cold storage doors, shopping cart usage, pattern of picking up or putting back product, etc. may be detected and analyzed by the vibration sensors. These vibration signals, coupled with visual recordings from image sensors, may be used to extract a customer's behavior characteristics. When a person is in a blind spot, or changes her appearance, such that the system has difficulties to identify the person based on image data, the system may use the vibration signals to re-identify the person.

In some embodiments, the computer system may determine, based on data received from one or more of the sensors, a movement path within the automated-checkout store associated with the person. In some embodiments, the computer system may identify one or more features (e.g., appearance features of face, body, or cloths, visual patterns of walking, vibration frequency signature when walking) associated with the person and use the features to track the movement of the person. In some embodiments, the space within the automated-checkout store may be divided into a plurality of regions, each monitored with a set of image sensors (e.g., four cameras at the corners of a rectangular region) and/or one or more other sensors. The person's movement path in each region may be separately tracked by the sensors corresponding to the region. The tracking results for different regions may then be integrated by concatenating overlapping areas and optimizing from the perspective of the entire store perspective. Based on the data collected by the sensors, the computer system may construct a model describing the 3D movement of the person. In some embodiments, one or more piezoelectric sensors or piezo film sensors may be used in conjunction with image sensors to determine a person's movement path within the automated-checkout store. The piezo film sensors may be embedded in the floor of the automated-checkout store (e.g., in one or more floor tiles). The piezo film sensors may generate electrical signals in response to steps of a person. The computer system may determine a trajectory of the person based on signals from a plurality of piezo film sensors located in a plurality of locations within the automated-checkout store.

In some embodiments, data of people trajectory and body key points can also be collected for video analysis to help optimize store layouts and personalized product recommendation. Global optimization can be performed to integrate data from different sensors. For example, total number of people in the store can be detected by monitoring how many people enter through the door. The total number of people in the store can be used in global optimization. For example, if two modules have disagreements on two people images close in distance. If the two images are counted as two people, the total number of people in store may be more than the total number entering the store counted by the system. In that case, the global optimization can be performed to count those two images as one person.

At step 450 of FIG. 4, the computer system may store information associating the product item with the person. In some embodiments, based on the determined interaction between the person and the product item, the computer system may determine that the person has taken the product item in possession with an intent to purchase the product item. The information associating the product item with the person may indicate that the product item will be purchased by the person. In some embodiments, another determined interaction between the person and the product item (e.g., placing the product item back on a shelf) may indicate that the person intends to return the product to the store. In this case, the computer system may remove the stored information associating the product with the person or store additional information indicating that the product item is has been returned by the person.

In some embodiments, the computer system may recognize an identity of the product item that is interacted with in order to associate the product item with the person. In some embodiments, the computer system may extract, from data received from one or more of the sensors, one or more features associated with the product item. The features may comprise a weight, a shape, a color, a surface force image, a position, or a conductivity. The computer system may then determine, using a machine-learning model, an identity of the product item based on one or more of the extracted features. In some embodiments, for product items that are difficult to distinguish based on the external characteristics (e.g., cloths, electronics) or product items that are of particular importance (e.g., expensive products), the automated-checkout store may use other suitable methods to verify the identity of the product item. For example, RFID tags may be applied to the product items. The store may further comprise one or more RFID sensors to read the RFID tags and determine the identities of the product items.

In some embodiments, characteristics of product items such as weight, visual appearance, surface force image, and conductivity may be used to identify the product. Information about such characteristics of each product may be stored in the computer system. For a product item interacted with by a person, one or more sensors may collect information about such characteristics of the product item. For example, one or more cameras may capture images (e.g., RGB images, images with depth information) of the product item. As another example, one or more weight sensors, capacitive sensors, and/or force sensors may collect information about the weight, shape, conductivity, and surface force image of the product item. The conductivity information may be used to determine the type of material which makes up at least a part of the product. The surface force image may be used to determine footprint of the retail product and the force exerted by the surface of the product.

In some embodiments, data from different sensors may indicate different identities of a product item. The computer system may determine one of the identities based on a confidence score associated with each identity. For example, the computer system may determine, based on data received from a first sensor, a first identity for the product item associated with a first confidence score. The computer system may determine, based on data received from a second sensor, a second identity for the product item associated with a second confidence score. The computer system may select one of the first identity and the second identity as the identity of the product item based on a comparison of the first confidence score and the second confidence score.

In some embodiments, for a characteristic of a product item that may take a value within a range, the computer system may determine the value based on a combination of data from different sensors. For example, the computer system may obtain, based on data received from the sensors, a plurality of values associated with a characteristic of the product item. Each of the values may be determined based on data received from one of the sensors. The computer system may determine a final value corresponding to the characteristic based at least in part on a weighted average of the plurality of values. The weight assigned to each value may be based on a confidence score associated with the sensor corresponding to the value.

At step 460 of FIG. 4, the computer system may deduct a payment amount from the identified account, wherein the payment amount is based on a price of the product item associated with the person. In some embodiments, the computer system may obtain a price for each product item that has been interacted with by the person (e.g., picked up and placed in a shopping cart). When the person is about to exit the automated-checkout store, the computer system may generate a detailed list of product items purchased by the person, itemized prices, and a total amount to be paid by the person. The itemized receipt may be displayed or printed out for the person by a kiosk or another suitable electronic device (e.g., an iPad). The itemized receipt may also be sent to the person by, for example, emails or text messages. The total amount may then be charged to the account associated with the person. In some embodiments, based on input of the person (e.g., swipe of a card, login information) or pre-stored information, the computer system may obtain and hold a token associated with the person, which may be provided to a third-party payment service provider to charge the person. In some embodiments, the computer system may keep any information about the person without uploading the information to the cloud but only transmit a token associated with the person to an external system. In this manner, the computer system may protect the privacy of the person.

Figure 7:
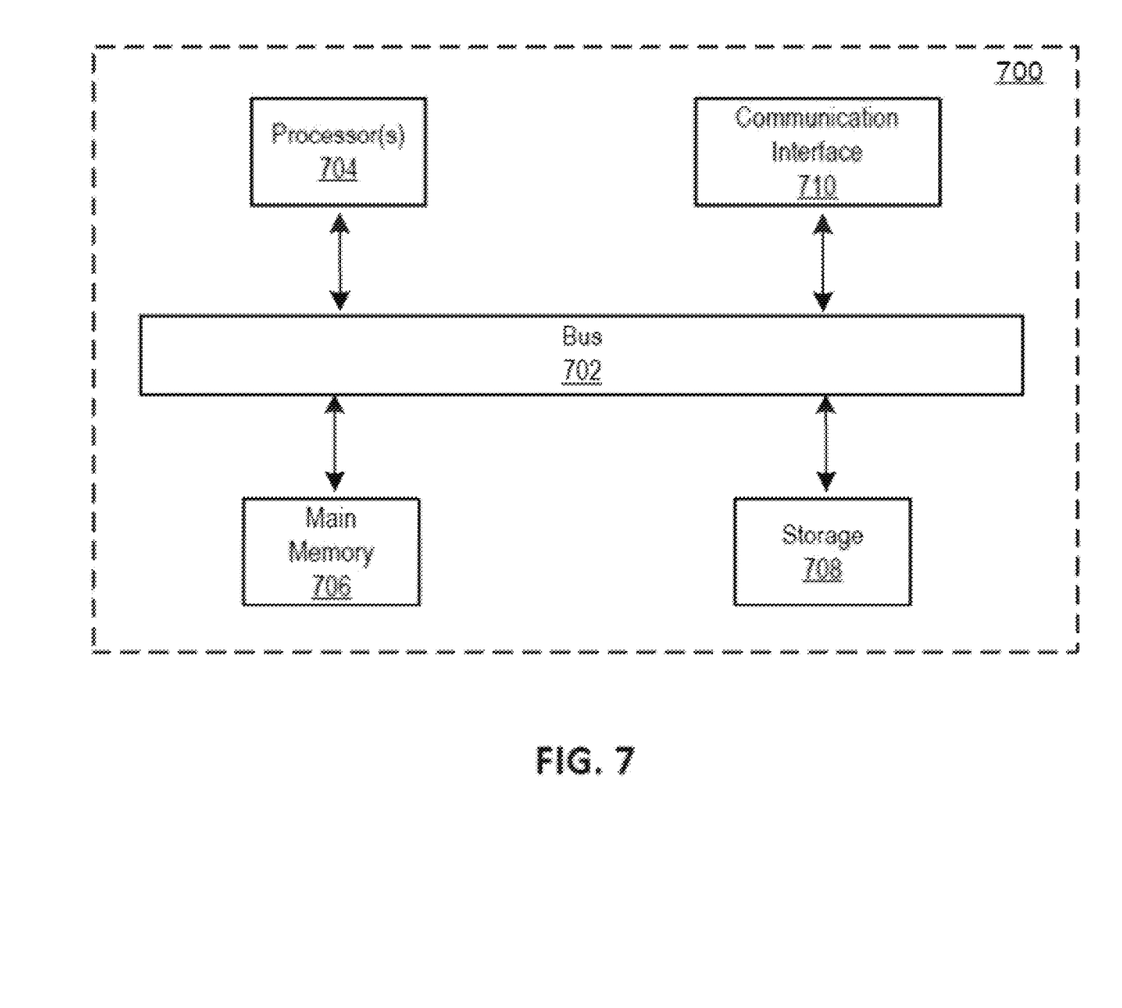
FIG. 7 illustrates an example electronic device.

FIG. 7 illustrates an example electronic device. The electronic device 700 may comprise a bus 702 or other communication mechanism for communicating information and one or more hardware processors 704 coupled with bus 702 for processing information. Hardware processor(s) 704 may be, for example, one or more general purpose microprocessors.

The electronic device 700 may also include a main memory 706, such as a random access memory (RAM), cache and/or other dynamic storage devices, coupled to bus 702 for storing information and instructions to be executed by processor(s) 704. Main memory 706 also may be used for storing temporary variables or other intermediate information during execution of instructions to be executed by processor(s) 704. Such instructions, when stored in storage media accessible to processor(s) 704, may render electronic device 700 into a special-purpose machine that is customized to perform the operations specified in the instructions. Main memory 706 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The electronic device 700 may implement the techniques described herein using customized hard-wired logic, one or more ASICs or FPGAs, firmware and/or program logic which in combination with the electronic device may cause or program electronic device 700 to be a special-purpose machine. According to one embodiment, the techniques herein are performed by electronic device 700 in response to processor(s) 704 executing one or more sequences of one or more instructions contained in main memory 706. Such instructions may be read into main memory 706 from another storage medium, such as storage device 708. Execution of the sequences of instructions contained in main memory 706 may cause processor(s) 704 to perform the process steps described herein. For example, the processes/methods disclosed herein may be implemented by computer program instructions stored in main memory 706. When these instructions are executed by processor(s) 704, they may perform the steps as shown in corresponding figures and described above. In alternative embodiments, hard-wired circuitry may be used in place of or in combination with software instructions.

The electronic device 700 also includes a communication interface 710 coupled to bus 702. Communication interface 710 may provide a two-way data communication coupling to one or more network links that are connected to one or more networks. As another example, communication interface 710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A method for tracking a product item in an automated-checkout store, comprising:

receiving, by a computer system from a plurality of sensors including at least one or more cameras, one or more weight sensors, one or more pressure sensors, and one or more capacitive sensors, data collected by the sensors;

identifying, by the computer system, an account associated with a person who enters the store;

receiving, by the computer system, data on movement of the product item collected by the plurality of the sensors;

determining, by the computer system, an interaction between the person and the product item based on the data collected by the plurality of the sensors;

extracting, by the computer system, from the data received from the plurality of the sensors, a plurality of features associated with the product item, wherein the features comprise a conductivity, a color, a position, and a surface force image, the conductivity is used to determine a type of material that makes up at least a part of the product, and the surface force image is used to determine a footprint of the product that includes a shape of a bottom surface of the product;

determining, by the computer system, using a machine-learning model, an identity of the product item based on the extracted features including the conductivity, the color, the position, and the surface force image, wherein the machine-learning model is trained based on training data collected from the plurality of the sensors;

storing, by the computer system, information associating the product item with the person; and deducting, by the computer system, a payment amount from the identified account, wherein the payment amount is based on a price of the product item associated with the person.

2. The method of claim 1, wherein one or more of the sensors are affixed to one or more structures in the automated-checkout store, the one or more structures comprising any of:
a ceiling;
a floor;
a shelf;
a rack; and
a refrigerator.

3. The method of claim 1, wherein the plurality of sensors further comprise one or more of:
a force sensor;
a vibration sensor;
a proximity sensor; and
a resistance-based film sensor.

4. The method of claim 1, further comprising:
determining, by the computer system based on the data received from a first sensor of the plurality of the sensors, a first identity for the product item associated with a first confidence score;
determining, by the computer system based on the data received from a second sensor of the plurality of the sensors, a second identity for the product item associated with a second confidence score; and
selecting one of the first identity and the second identity as the identity of the product item based on a comparison of the first confidence score and the second confidence score.

5. The method of claim 1, further comprising:
obtaining, by the computer system based on the data received from the plurality of the sensors, a plurality of values associated with a characteristic of the product item, wherein each of the values is determined based on the data received from one of the plurality of the sensors; and
determining, by the computer system, a final value corresponding to the characteristic based at least in part on a weighted average of the plurality of values.

6. The method of claim 1, further comprising:
determining, by the computer system based on the data received from one or more of the plurality of the sensors, a movement path within the automated-checkout store associated with the person.

7. The method of claim 1, wherein the determining an interaction between the person and the product item comprises:

determining, based on the data received from one or more of the plurality of the sensors, that the person is located in proximity to the product item in a period of time;
detecting one or more movements of a hand of the person with respect to the product item; and
determining the interaction based on the one or more detected movements.

8. A system for tracking a product item in an automated-checkout store comprising a computer system and a plurality of sensors including at least one or more cameras, one or more weight sensors, one or more pressure sensors, and one or more capacitive sensors, the computer system comprising a processor and a non-transitory computer-readable storage medium storing instructions executable by the processor to cause the system to perform operations comprising:
receiving, by the computer system from the plurality of the sensors, data collected by the plurality of the sensors;
identifying, by the computer system, an account associated with a person who enters the store;
receiving, by the computer system, data on movement of the product item collected by the plurality of the sensors;
determining, by the computer system, an interaction between the person and the product item based on the data collected by the plurality of the sensors;
extracting, by the computer system, from the data received from the one or more plurality of the sensors, a plurality of features associated with the product item, wherein the features comprise a conductivity, a color, a position, and a surface force image, the conductivity is used to determine a type of material that makes up at least a part of the product, and the surface force image is used to determine a footprint of the product that includes a shape of a bottom surface of the product;
determining, by the computer system, using a machine-learning model, an identity of the product item based on the extracted features including the conductivity, the color, the position, and the surface force image, wherein the machine-learning model is trained based on training data collected from the plurality of the sensors;
storing, by the computer system, information associating the product item with the person; and
deducting, by the computer system, a payment amount from the identified account, wherein the payment amount is based on a price of the product item associated with the person.

9. The system of claim 8, wherein one or more of the sensors are affixed to one or more structures in the automated-checkout store, the one or more structures comprising any of:
a ceiling;
a floor;
a shelf;
a rack; and
a refrigerator.

10. The system of claim 8, wherein the plurality of sensors further comprise one or more of:
a force sensor;
a vibration sensor;
a proximity sensor; and
a resistance-based film sensor.

11. The system of claim 8, wherein the operations further comprise:
determining, by the computer system based on the data received from a first sensor of the plurality of the sensors, a first identity for the product item associated with a first confidence score;

determining, by the computer system based on the data received from a second sensor of the plurality of the sensors, a second identity for the product item associated with a second confidence score; and selecting one of the first identity and the second identity as the identity of the product item based on a comparison of the first confidence score and the second confidence score.

12. The system of claim 8, wherein the operations further comprise:

obtaining, by the computer system based on the data received from the plurality of the sensors, a plurality of values associated with a characteristic of the product item, wherein each of the values is determined based on the data received from one of the plurality of the sensors; and determining, by the computer system, a final value corresponding to the characteristic based at least in part on a weighted average of the plurality of values.

13. The system of claim 8, wherein the operations further comprise:

determining, by the computer system based on the data received from one or more of the plurality of the sensors, a movement path within the automated-checkout store associated with the person.

14. The system of claim 8, wherein the determining an interaction between the person and the product item comprises:

determining, based on the data received from one or more of the plurality of the sensors, that the person is located in proximity to the product item in a period of time;

detecting one or more movements of a hand of the person with respect to the product item; and determining the interaction based on the one or more detected movements.

15. A non-transitory computer-readable storage medium for tracking a product item in an automated-checkout store, configured with instructions executable by one or more processors to cause the one or more processors to perform operations comprising:

receiving, from a plurality of sensors including at least one or more cameras, one or more weight sensors, one or more pressure sensors, and one or more capacitive sensors, data collected by the sensors;

identifying an account associated with a person who enters the store;

receiving, by the computer system, data on movement of the product item collected by the plurality of the sensors;

determining an interaction between the person and the product item based on the data collected by the plurality of the sensors;

extracting, by the computer system, from the data received from the plurality of the sensors, a plurality of features associated with the product item, wherein the features comprise a conductivity, a color, a position, and a surface force image, the conductivity is used to determine a type of material that makes up at least a part of the product, and the surface force image is used to determine a footprint of the product that includes a shape of a bottom surface of the product;

determining, by the computer system, using a machine-learning model, an identity of the product item based on the extracted features including the conductivity, the color, the position, and the surface force image, wherein the machine-learning model is trained based on training data collected from the plurality of the sensors;

storing information associating the product item with the person; and deducting a payment amount from the identified account, wherein the payment amount is based on a price of the product item associated with the person.

16. The non-transitory computer-readable storage medium of claim 15, wherein the operations further comprise:

determining, by the computer system based on the data received from one or more of the plurality of the sensors, a movement path within the automated-checkout store associated with the person.

17. The non-transitory computer-readable storage medium of claim 15, wherein the determining an interaction between the person and the product item comprises:

determining, based on the data received from the plurality of the sensors, that the person is located in proximity to the product item in a period of time;

detecting one or more movements of a hand of the person with respect to the product item; and determining the interaction based on the one or more detected movements.

18. The non-transitory computer-readable storage medium of claim 15, wherein the plurality of sensors further comprise any of:

a force sensor;

a vibration sensor;

a proximity sensor; and a resistance-based film sensor.

19. The non-transitory computer-readable storage medium of claim 15, wherein the operations further comprise:

determining, by the computer system based on the data received from a first sensor of the plurality of the sensors, a first identity for the product item associated with a first confidence score;

determining, by the computer system based on the data received from a second sensor of the plurality of the sensors, a second identity for the product item associated with a second confidence score; and selecting one of the first identity and the second identity as the identity of the product item based on a comparison of the first confidence score and the second confidence score.

20. The non-transitory computer-readable storage medium of claim 15, wherein the operations further comprise:

obtaining, by the computer system based on the data received from the plurality of the sensors, a plurality of values associated with a characteristic of the product item, wherein each of the values is determined based on the data received from one of the plurality of the sensors; and determining, by the computer system, a final value corresponding to the characteristic based at least in part on a weighted average of the plurality of values.

* * * * *

UNITED STATES PATENT AND TRADEMARK OFFICE
CERTIFICATE OF CORRECTION

PATENT NO. : 11,443,291 B2
APPLICATION NO. : 16/374692
DATED : September 13, 2022
INVENTOR(S) : Steve Gu et al.

It is certified that error appears in the above-identified patent and that said Letters Patent is hereby corrected as shown below:

In the Claims

Claim 8, Column 20, Line 28:
"recieved from the one or more plurality of the sensors," should read -- received from the plurality of the sensors, --.

Signed and Sealed this
Twentieth Day of August, 2024

Katherine Kelly Vidal
*Director of the United States Patent and Trademark Office*